United States Patent [19]
Iwata

[11] Patent Number: 5,324,103
[45] Date of Patent: Jun. 28, 1994

[54] AUTOMOTIVE BRAKE CONTROL SYSTEM

[75] Inventor: Toru Iwata, Kanagawa, Japan

[73] Assignee: Nissan Motor Co., Ltd., Yokoyama, Japan

[21] Appl. No.: 931,614

[22] Filed: Aug. 18, 1992

[30] Foreign Application Priority Data

Aug. 20, 1991 [JP] Japan .................................. 3-207905
Aug. 20, 1991 [JP] Japan .................................. 3-207911

[51] Int. Cl.⁵ .................................................. B60T 8/02
[52] U.S. Cl. ................................. 303/113.2; 303/110; 303/116.2
[58] Field of Search ............... 303/113.2, 113.4, 114.1, 303/116.1, 116.2, 110; 180/197; 364/426.01, 426.02, 426.03

[56] References Cited

U.S. PATENT DOCUMENTS

| | | | |
|---|---|---|---|
| 4,033,634 | 7/1977 | Arai et al. | 303/110 X |
| 4,135,769 | 1/1979 | Williams et al. | 303/110 X |
| 4,682,824 | 7/1987 | Burgdorf et al. | 303/113.4 X |
| 4,880,282 | 11/1989 | Makino et al. | 303/110 X |
| 4,883,326 | 11/1989 | Sugitani et al. | 303/110 |
| 5,058,961 | 10/1991 | Mergenthaler et al. | 303/116.2 X |
| 5,131,730 | 7/1992 | Kollers et al. | 303/113.2 |
| 5,141,296 | 8/1992 | Arikawa | 303/113.2 |
| 5,188,437 | 2/1993 | Willmann | 303/116.2 X |

FOREIGN PATENT DOCUMENTS 0482367  4/1992  European Pat. Off. ......... 303/113.2
58-122246  7/1983  Japan .

Primary Examiner—Douglas C. Butler
Assistant Examiner—Peter M. Poon
Attorney, Agent, or Firm—Lowe, Price, LeBlanc & Becker

[57] ABSTRACT

An automotive brake control system includes a master cylinder, an external brake fluid pressure source, a wheel-cylinder pressure control actuator applied commonly to a traction control (TCS control) performed for suppressing excessive driving force exerted on driven wheels during quick acceleration and an anti-skid brake control (ABS control) performed for preventing brakes from locking vehicle wheels during quick braking, or braking on a low frictional road, and a fluid pump for supplying the brake fluid stored in a fluid reservoir to a pressure accumulator, and a controller for controlling the pump, such that the pump is driven for a first setting time in an ABS pressure reducing mode and drives the pump for a second setting time substantially at a time point where one cycle of the TCS control ends, so as to feed the brake fluid from the reservoir to the accumulator.

8 Claims, 7 Drawing Sheets

AUTOMOTIVE BRAKE CONTROL SYSTEM

BACKGROUND OF THE INVENTION

1. Field of the Invention

The present invention relates to a control system for controlling braking forces applied to vehicle wheels in an automotive vehicle, which system is applied to electronically controlled brakes, and particularly to an automotive brake control system employing an external brake fluid pressure source for optimally controlling braking force applied to vehicle wheels, in which a traction control is performed during quick starting, for example, and an anti-skid brake control is performed during braking on a low frictional road surface. Specifically, the present invention relates to an automotive brake control system employing a brake fluid pressure control actuator applied commonly to both a traction control system and an anti-skid brake control system.

2. Description of the Prior Disclosure

Recently, there have been disclosed and developed various automotive brake control systems, namely a traction control system generally abbreviated as a "TCS" which is provided for suppressing excessive driving force exerted on driven wheels during quick depressing operation of the accelerator pedal, such as quick starting, quick acceleration, or the like, an anti-skid brake control system generally abbreviated as an "ABS" which is provided for preventing brakes from locking vehicle wheels during quick braking or during braking on a low frictional road surface so as to provide maximum effective braking, and a servo-assisted brake control device which is provided for generating a wheel-cylinder pressure higher than a master-cylinder pressure at a relatively light brake pedal pressure. One such conventional automotive brake control system has been disclosed it. Japanese Patent First Publication Tokkai (Showa) 58-122246.

The previously noted conventional brake control system includes a first pump unit serving as an external brake fluid pressure source, a brake fluid pressure control valve, and a second pump unit for returning brake fluid temporarily stored in a brake fluid reservoir to an accumulator. In addition to the above, the conventional brake control system includes a brake fluid pressure control actuator provided for adjusting a wheel-cylinder pressure on the basis of the fluid pressure generated by the external brake fluid pressure source, i.e., the first pump unit, during the traction control operation, and for adjusting the wheel-cylinder pressure on the basis of the master-cylinder pressure during the anti-skid brake control operation. In such a conventional brake control system, when the wheel-cylinder pressure must be reduced during the traction control or the anti-skid brake control, the above fluid pressure control valve is shifted to a pressure reducing position wherein the brake fluid in the wheel-cylinder is returned to the brake fluid reservoir. Simultaneously, the brake fluid stored in the brake fluid reservoir is fed to the accumulator by means of the second pump unit, so as to stably supply a sufficient amount of brake fluid with a desirable fluid pressure to the wheel-cylinder, during pressure-increasing operation in wheel-cylinders, such as quick braking. However, the aforementioned conventional brake control system is designed to operate the second pump unit when the wheel-cylinder pressure is reduced during the traction control operation or the anti-skid brake control operation.

As is generally known, the control cycle of the TCS is determined depending on the operating time of quick acceleration or quick starting. On the other hand, the control cycle of the ABS is determined depending upon the operating time of quick braking or braking on a low frictional road surface. Additionally, the increase in the wheel-cylinder pressure and the decrease in the wheel-cylinder pressure are alternately repeated at a relatively short cycle, during the anti-skid brake control. As appreciated from the above, the control cycle of the TCS is generally longer than that of the ABS. Therefore, when the wheel-cylinder pressure is reduced during a traction control, the pressure reducing time becomes longer rather than during an anti-skid brake control. During such a traction control with a wheel-cylinder pressure reduction, the vehicle occupants may feel uncomfortable, due to undesirable noise and vibration created by rotation of a drive motor having a driving connection with the second pump.

To avoid such discomfort, it is possible to arrange it so that the second pump is in an inactive state during the traction control with the wheel-cylinder pressure reduction, and that the second pump is in an active state only during the anti-skid brake control with the wheel-cylinder pressure reduction. In this case, supposing that the traction control operation is continuously performed, the great amount of brake fluid is stored in the reservoir just after the traction control ends, since there is no brake fluid supply from the reservoir to the accumulator in the inactive state of the second pump. Under this condition, supposing that the anti-skid brake control is performed, it is difficult that the brake fluid in the wheel-cylinder returns the reservoir when the wheel-cylinder pressure is reduced in accordance with the anti-skid brake control. That is, the wheel-cylinder pressure cannot be smoothly reduced, thereby causing a relatively long time for a brake fluid pressure reduction when the wheel-cylinder pressure reduction is required during the anti-skid brake control. This results in an undesirable low step-response during the anti-skid brake control performed after consecutively performed traction control operations.

SUMMARY OF THE INVENTION

It is therefore, in view of the above disadvantages, an object of the present invention to provide an automotive brake control system employing a brake fluid pressure control actuator applied commonly to both a TCS and an ABS, which can reduce both noise and vibration created by an auxiliary pump unit provided for supplying brake fluid stored in a brake fluid reservoir to a brake-fluid pressure accumulator, during a traction control.

It is another object of the invention to provide an automotive brake control system employing a brake fluid pressure control actuator applied commonly to both a TCS and an ABS, which a wheel-cylinder pressure reduction is reliably and assuringly achieved even though the anti-skid brake control is performed just after consecutively performed traction control operations.

In order to accomplish the aforementioned and other objects, an automotive brake control system according to a preferred embodiment comprises a master cylinder for generating a master-cylinder pressure based on a movement of a brake pedal and an external brake fluid pressure source for generating a brake fluid pressure regardless of depression of the brake pedal. A wheel-cylinder pressure control means is provided for controlling a wheel-cylinder pressure in a wheel cylinder on the basis of the brake fluid pressure generated by the external brake fluid pressure source during a traction control performed fox suppressing excessive driving force exerted on driven wheels and on the basis of the master-cylinder pressure during an anti-skid brake control performed for preventing brakes from locking vehicle wheels. The wheel-cylinder pressure control means includes a fluid reservoir storing brake fluid released from the wheel cylinder, and a brake fluid return pump for supplying the brake fluid stored in the reservoir to a pressure accumulator, the brake fluid return pump being operative during the anti-skid brake control and inoperative during the traction control pump control means is provided for controlling the pump, such that the pump control means drives the pump for a first predetermined period of time in a wheel-cylinder pressure reducing mode in which the wheel-cylinder pressure is reduced during the anti-skid brake control and drives the brake fluid when pump for a second predetermined period of time substantially at a time point where one cycle of from the reservoir to the accumulator. The pump control means drives the brake fluid return pump for the second period of time in synchronization with an output of stop instruction for the traction control. It is preferable that the pump control means drives the brake fluid return pump for the second period of time from the beginning of the output of stop instruction of the traction control.

The brake control system may further comprise a braking operation detection means for monitoring the depression of the brake pedal, and the pump control means drives the pump for the second period of time from a time point where the detection means determines that the brake pedal is depressed substantially at the end of one cycle of the traction control. The braking operation detection means includes a stop lamp switch generating a signal representative of an ON state or an OFF state thereof, a master-cylinder pressure sensor, or a stroke sensor monitoring a depressed amount of the brake pedal. The pump control means drives the brake fluid control pump for the second period of time from a time point where the brake pedal is depressed, upon, just before, or just after the output of stop instruction for the traction control.

The wheel-cylinder pressure control means may include a directional control valve means for switching the brake fluid pressure supplied therethrough to the wheel cylinder from one of the fluid pressure generated from the external brake fluid pressure source and the master-cylinder pressure to the other, and a fluid pressure control valve means being capable of operating in three modes, namely a wheel-cylinder pressure intensifying mode in which the pressure control valve permits the fluid pressure output from the directional control valve means to apply to the wheel cylinder, a wheel-cylinder pressure holding mode in which the pressure control valve means prevents the brake fluid from flowing from and toward the wheel-cylinder, and a wheel-cylinder pressure reducing mode in which the pressure control valve means permits the brake fluid in the wheel cylinder from being released. Both of the directional control valve means and the fluid pressure control valve means may comprise an electromagnetic two-position solenoid valve.

DESCRIPTION OF THE PREFERRED EMBODIMENTS

Figure 1:
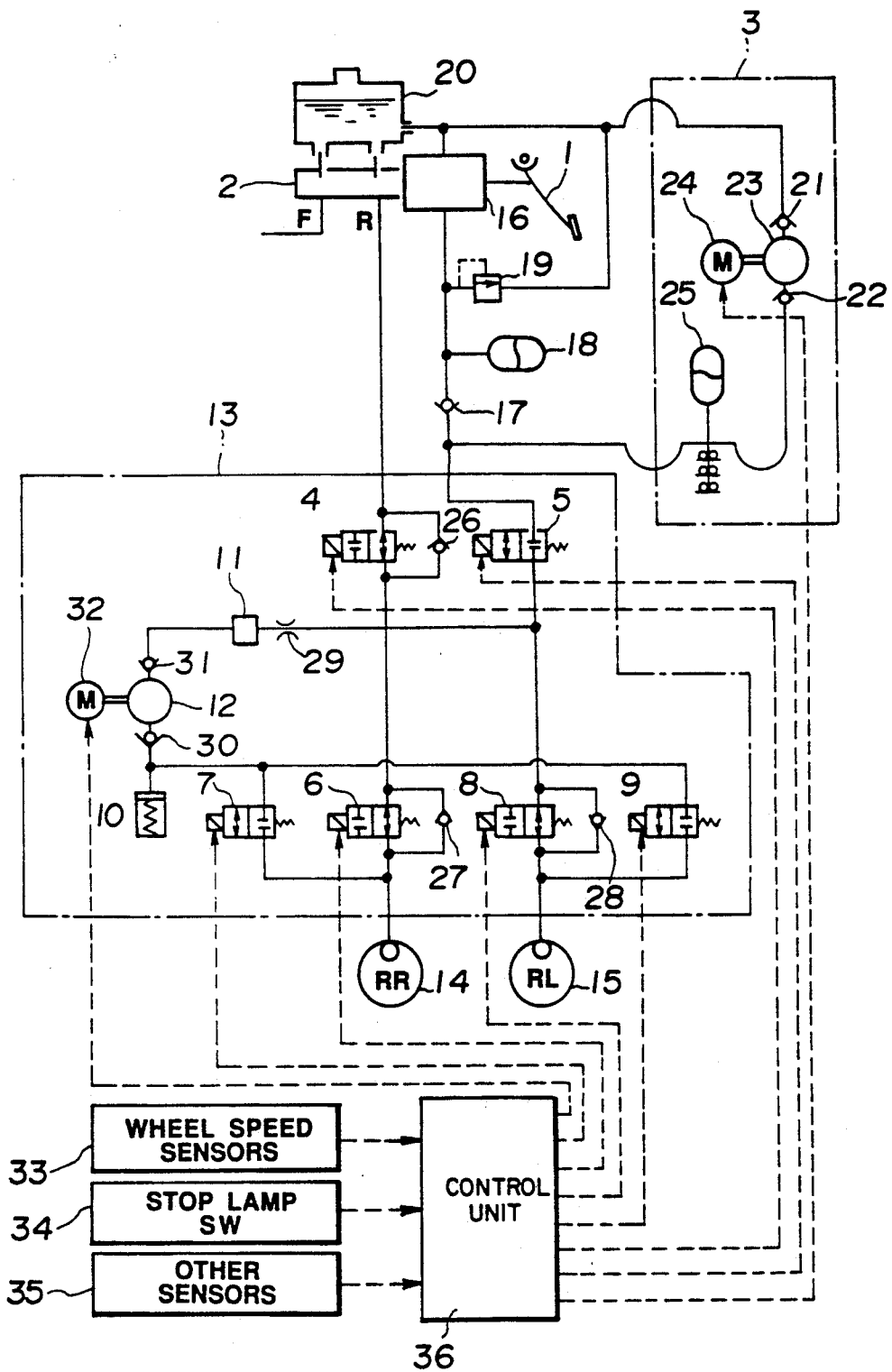
FIG. 1 is a system diagram illustrating one embodiment of an automotive brake control system according to the invention, which controls both braking forces applied to driven wheels, namely a rear-right wheel and a rear-left wheel, independently of each other.

Referring now to the drawings, particularly to FIG. 1, there is shown an automotive brake control system according to the invention, which is applicable to suitably control braking forces applied to a rear-right wheel and a rear-left wheel, both corresponding to driven wheels in a rear-wheel drive vehicle. The brake control system includes a master cylinder 2 generating a master-cylinder pressure based on the magnitude of depressing force applied onto a brake pedal 1, an external brake fluid pressure source 3 providing a brake fluid pressure irrespective of depression of the brake pedal 1, a pair of directional control valves, namely a first directional control valve 4 and a second directional control valve 5, a rear-right wheel-cylinder pressure intensifying valve 6 for a rear-right wheel cylinder 14, a rear-right wheel-cylinder pressure reducing valve 7, a rear-left wheel-cylinder pressure intensifying valve 8 for a rear-left wheel cylinder 15, a rear-left wheel-cylinder pressure reducing valve 9, and an auxiliary pump 12 provided for supplying brake fluid stored in a brake fluid reservoir 10 to a pressure accumulator 11. As hereinafter described in detail, since the additional pump 12 is mainly operated when the wheel-cylinder pressure is reduced during the anti-skid brake control, the pump 12 will be referred to as an "ABS pump".

The brake control system of the invention also includes brake fluid pressure control actuator 13 which is provided for adjusting the wheel-cylinder pressure on the basis of the fluid pressure generated by the external brake fluid pressure source 3 during the traction control in which the brake pedal 1 is depressed and for adjusting the wheel-cylinder pressure on the basis of the master-cylinder pressure output from the master cylinder 2 during the anti-skid brake control.

A hydraulic booster 16 is provided between the brake pedal 1 and the master cylinder 2, for applying an intensified force greater than an actual brake-pedal depressing force to the piston slidably enclosed in the master cylinder 2. The booster 16 acts to boost the master-cylinder pressure on the basis of the fluid pressure generated from a pressure accumulator 18 accumulating the fluid pressure fed from the external fluid pressure source 3 through a check valve 17.

Reference numeral 19 designates a relief valve connected to an intermediate line disposed between the booster 16 and the accumulator 18, so as to control an upper limit of the fluid pressure applied to the inlet port of the booster 16. Reference numeral 20 designates a usual brake fluid reservoir attached to the master cylinder 2, for storing brake fluid enough to be used in the master cylinder 2 and the external fluid pressure source 3.

The external brake fluid pressure source 3 comprises of a hydraulic pump 23 having an inlet port introducing brake fluid from the main reservoir 20 through a check valve 21 and an outlet port discharging the pressurized brake fluid and connected to a check valve 22, a drive motor having a driving connection with the pump 23, and a hydraulic accumulator 25 provided in an output pressure line interconnecting the two check valves 17 and 22.

A check valve 26 is provided in a bypass line by-passing the first directional control valve 4, for supplying the master-cylinder pressure greater than a setting pressure of the check valve 26 to both the rear-right wheel-cylinder pressure intensifying valve 6 and the rear-left wheel-cylinder pressure intensifying valve 8, when the master-cylinder pressure is generated from the outlet port of the master-cylinder in a closed state of the first directional control valve 4. In addition to the above, a check valve 27 is provided in a bypass line by-passing the pressure intensifying valve 6, for preventing back-flow of brake fluid flowing from the rear-right wheel cylinder 14 to the first directional control valve 4, when the fluid pressure obtained upstream of the pressure intensifying valve 6 is less than the fluid pressure obtained downstream of the valve 6 in a fully closed state of the valve 6. Similarly, a check valve 28 is provided in a bypass line by-passing the pressure intensifying valve 8, for preventing back-flow of brake fluid flowing from the rear-left wheel cylinder 15 to the second directional control valve 5, when the fluid pressure obtained upstream of the pressure intensifying valve 8 is less than the fluid pressure obtained downstream of the valve 8 in a fully closed state of the valve 8.

An orifice 29 is provided in a communication line interconnecting the accumulator 11 and the intermediate line disposed between the first directional control valve 4 and the rear-right wheel-cylinder pressure intensifying valve 6 and interconnecting the accumulator 11 and the intermediate line disposed between the second directional control valve 5 and the rear-left wheel-cylinder pressure intensifying valve 8, so as to control the flow rate of brake fluid output from accumulator 11.

A pair of check valves 30 and 31 are respectively provided downstream of and upstream of the ABS pump 12, so as to direct the brake fluid flow from the reservoir 10 to the accumulator 11. The ABS pump has a driven connection with an ABS pump driving motor 32.

In the preferred embodiment, each of valves 4, 5, 6, 7, 8 and 9 is an electromagnetic two-position solenoid valve. Although the brake fluid pressure control actuator is provided for adjusting only the wheel-cylinder pressures in the rear wheel cylinders 14 and 15, the same brake fluid pressure control actuator is provided for adjusting the wheel-cylinder pressures in the front wheel cylinders. As shown in broken lines of FIG. 1, the valves 4, 5, 6, 7, 8, and 9, and the two motors 24 and 32 are connected to an output interface of a control unit 36. The input interface of the control unit 36 is connected to various sensors, namely wheel-speed sensors for monitoring a front-right wheel speed, a front-left wheel speed, a rear-right wheel speed and a rear-left wheel speed, and the other sensors 35, such as a longitudinal acceleration sensor for monitoring a longitudinal acceleration exerted on the vehicle body, a master-cylinder pressure sensor for monitoring the master-cylinder pressure, a throttle opening-angle sensor for monitoring an opening angle of the throttle valve and the like. The input interface is also connected to a stop lamp switch 34. for monitoring whether the stop lamp is in an ON state or an OFF state. The control unit 36 outputs control instructions for the TCS and the ABS on the basis of the signals from the sensors 33 and 35, and the stop lamp switch 34, so as to achieve the traction control, the anti-skid brake control, the hydraulic pump control for the pump 23, and the ABS pump control, depending on the vehicle driving condition.

In general, traction control is performed to suppress excessive driving force exerted on the driven wheels under hard driving conditions, such as during quick acceleration or quick starting and to obtain an optimal traction performance and a high driving stability. The traction control (TCS control) is often performed in combination with a throttle-valve closing control according to which the throttle valve is closed to decrease the output torque generated by the engine, in such a manner as to apply controlled braking forces to driven wheels.

On the other hand, the anti-skid brake control (ABS control) is performed to adjust the wheel-cylinder pressure for each wheel cylinder, so as to prevent brakes from locking vehicle wheels during quick braking or braking on a low frictional road surface. The anti-skid brake control is usually performed by repeating an increase and decrease in the wheel-cylinder pressure to provide an optimal drivability and maximum effective braking, during braking. When the wheel-cylinder pressure is increased according to the anti-skid brake control, such an anti-skid brake control will be hereinbelow referred to as an "anti-skid pressure intensifying control". Conversely, when the wheel-cylinder pressure is reduced according to the anti-skid brake control, the anti-skid brake control will be hereinbelow referred to as an "anti-skid pressure reducing control" or an "ABS pressure reducing control".

The hydraulic pump control for the pump 23 performed such that fluid pressures in the accumulators 18 and 25 are maintained substantially constant, by activating and deactivating the pump motor 24.

Figure 2:
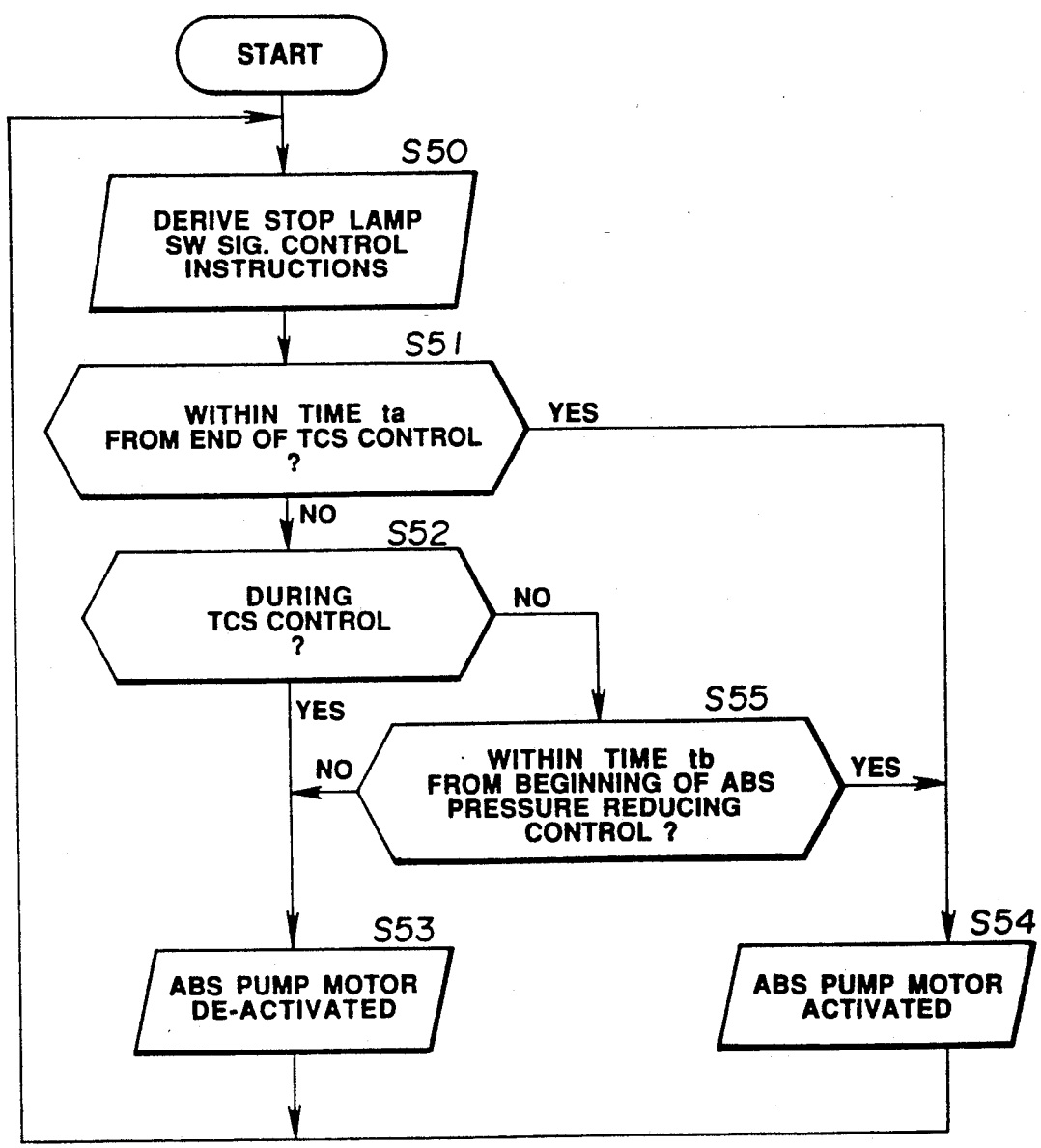
FIG. 2 is a flow chart illustrating a control procedure for an auxiliary pump unit controlled by a control unit utilized in a first embodiment of the brake control system according to the invention.

Referring now to FIG. 2, there is shown a control procedure for the ABS pump 12, which procedure is performed by the control unit employed in the first embodiment of the brake control system according to the invention. The procedure will be hereinbelow described in detail, in accordance with the flow chart of FIG. 2.

In step 50, the control unit determines whether the stop lamp switch is in an ON state or an OFF state on the basis of the stop lamp switch signal representative of an ON/OFF state of the stop lamp switch 34 and whether the TCS is operated, and whether the ABS is operated to reduce the wheel-cylinder pressure.

In step 51, the control unit determines whether or not the time elapsed from the end of the traction control is within a setting time $t_a$. If the answer to step 51 is in the negative (NO), step 52 proceeds, wherein a test is made to determine whether the control unit performs the traction control. If the answer to step 52 is in the affirmative (YES), step 53 proceeds wherein the control unit outputs a control instruction in response to which the ABS pump motor 32 is deactivated.

Alternatively, the answer to step 51 is in the affirmative, step 54 proceeds wherein the control unit outputs a control instruction in response to which the ABS pump motor 32 is activated.

If the answer to step 52 is in the negative, step 55 proceeds wherein a test is made to determine whether or not the time elapsed from the beginning the anti-skid pressure reducing control is within setting time $t_b$. If the answer to step 55 is in the negative, the procedure advances to step 53 with the result that the ABS pump motor is deactivated. Alternatively, if the answer to step 55 is in the affirmative, the procedure advances to step 54 in which the ABS pump motor is activated.

When the control unit of the first embodiment outputs the control instruction for the ABS control after the TCS control, the control operation is performed as follows.

First, the TCS control is started so as to reduce the magnitude of traction applied to driven wheels, utilizing controlled braking forces applied to the driven wheels, when the slippage occurring at the driven wheels exceeds a predetermined threshold value satisfying the TCS control starting condition. Under this condition, the control procedure flows through steps 50, 51, 52 and 53, in that order, since the TCS control is actually performed. At this time, the ABS pump motor 32 is deactivated and consequently the ABS pump 12 is not rotated. During the TCS control, the brake fluid pressure control actuator 13 is controlled by the control unit, such that the TCS control is performed on the basis of the brake fluid pressure generated by the external fluid pressure source 3 by switching the two valves 4 and 5 to ON states wherein the first directional control valve 4 is kept in a valve closed position and the second directional control valve 5 is kept in a valve open position.

The control unit of the first embodiment executes the TCS control among three modes, namely a wheel-cylinder pressure intensifying mode wherein the wheel-cylinder pressure intensifying valves 6 and 8 are both kept in OFF states, i.e., in valve open positions and the wheel-cylinder pressure reducing valves 7 and 9 are both kept in OFF states, i.e., in valve closed positions, with the result that the fluid pressure generated by the external fluid pressure source 3 is supplied to the wheel cylinders 14 and 15, a wheel-cylinder pressure holding mode wherein the pressure intensifying valves 6 and 8 are both held in ON states, i.e., in valve closed positions/and the pressure reducing valves 7 and 9 are both held in OFF states (in valve closed positions), with the result that the wheel-cylinder pressures in the wheel cylinders 14 and 15 are held unchanged, and a wheel-cylinder pressure reducing mode wherein the pressure intensifying valves 6 and 8 are both kept in ON states (in valve closed positions) and pressure reducing valves 7 and 9 are both held in ON states (in valve open states), with the result that the brake fluids in the wheel cylinders 14 and 15 return the reservoir 10, thereby resulting in reduction of wheel-cylinder pressure.

Just after the previously noted TCS control is finished, the time is measured by the timer employed in the control unit. Until the time elapsed from the end of the TCS control reaches a setting time $t_a$, the control procedure jumps from step 50 through step 51 to step 54. In this manner, the ABS pump 12 is rotated for the setting time $t_a$ just after a stop instruction of the TCS control has been output, with the result that the brake fluid stored in the reservoir 10 at the wheel-cylinder pressure reducing mode of the TCS control is returned to the accumulator 11.

After this, when the rear wheels would be locked due to quick braking or braking on a low frictional road surface, the ABS comes into operation. During the ABS control, the brake fluid pressure control actuator 13 is controlled by the control unit 36, such that the ABS control is performed on the basis of the master-cylinder pressure generated by the master cylinder 2 by switching the two valves 4 and 5 to OFF states wherein the first directional control valve 4 is kept in a valve open position and the second directional control valve 5 is kept in a valve closed position- The control unit 36 executes the ABS control among the wheel-cylinder pressure intensifying mode, the wheel-cylinder pressure holding mode, and the wheel-cylinder pressure reducing mode, in the same manner as the TCS control. In the wheel-cylinder pressure reducing mode of the ABS control, the brake fluid in each wheel cylinder can be smoothly reduced since the brake fluid stored in the reservoir 10 is returned to the accumulator 11 through the pump 12 driven for the setting time $t_a$ from the end of the TCS control. As set forth above, when the ABS control is performed after the output of a stop instruction of the TCS control, the control procedure flows from step 50 through steps 51 and 52 to step 55. Just after the previously described ABS pressure reducing control starts, the time is measured. Until the time elapsed from the beginning of the ABS pressure reducing control reaches a setting time $t_b$, the control procedure advances from step 55 to step 54. In this manner, the ABS pump 12 is rotated for the setting time $t_b$ from the beginning of the anti-skid pressure reducing control, with the result that the brake fluid stored in the reservoir 10 is returned to the accumulator 11. When the elapsed time reaches the setting time $t_b$, the procedure is shifted from step 54 to step 53 and as a result the ABS pump motor is deactivated, i.e., the ABS pump 12 is stopped.

Figure 3:
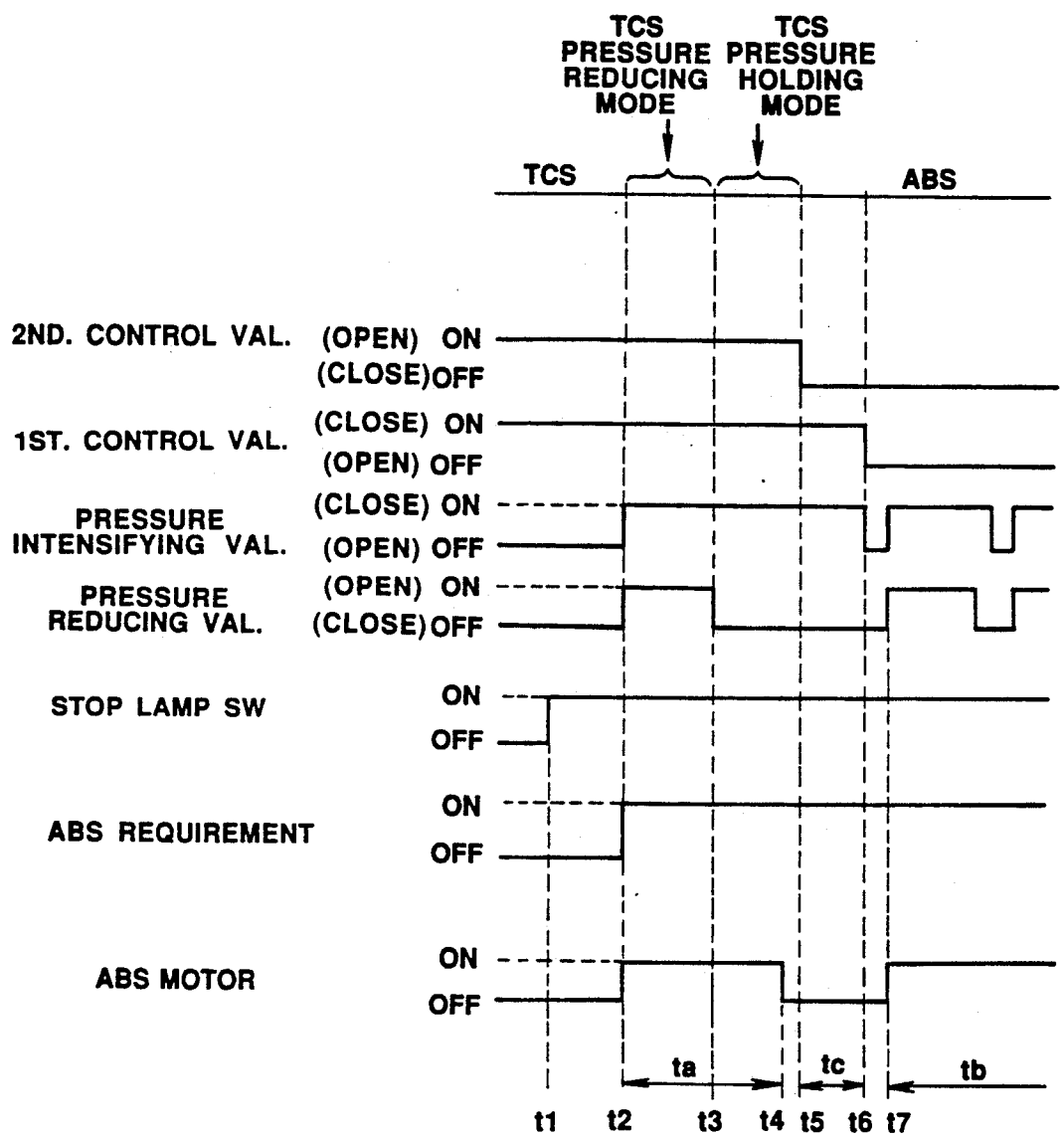
FIG. 3 is timing charts illustrating a control operation performed by the control unit of the embodiment, when an anti-skid control instruction is output during the traction control, i.e., when a brake pedal is depressed in a fully depressed state of an accelerator pedal.

When the ABS control is required during the traction control, so that the accelerator pedal and the brake-pedal are simultaneously depressed by right and left feet of the driver, the control unit of the first embodiment performs the control procedure in accordance with the time charts illustrated in FIG. 3.

Referring now to FIG. 3, the stop lamp switch 34 becomes ON at a time point $t_1$ during the TCS control. Thereafter, as soon as a predetermined time has elapsed and the time reaches a time point $t_2$, the TCS control instruction is stopped on the basis of the requirement for the ABS control. The requirement for the ABS control will be hereinafter referred to as an "ABS requirement". Upon the output of the ABS requirement at the time point $t_2$, the control unit 36 also outputs a control instruction according to which the ABS pump driving motor 32 is activated, i.e., kept in an ON state for a predetermined period of time $t_a$ until the time reaches from the time point $t_2$ to the time point $t_4$. Simultaneously, the control unit of the first embodiment controls the brake fluid pressure control actuator at the wheel-cylinder pressure reducing mode for a time interval defined between the two time points $t_2$ and $t_3$ and at the wheel-cylinder pressure holding mode for a time interval defined between the two time points $t_3$ and $t_5$. Such a transient procedure shifting from the wheel-cylinder pressure reducing mode to the wheel-cylinder pressure holding mode is necessary for a termination procedure for the TCS control. At the above noted TCS pressure reducing mode and the pressure holding mode, the second directional control valve 5 is kept in an ON state (in the valve open state), while the first directional control valve 4 is kept in an OFF state (in the valve closed state), as clearly seen in the two uppermost timing charts of FIG. 3. At the time point $t_5$, the second directional control valve 5 is switched from the ON state to the OFF state. On the other hand, the first directional control valve 4 is shifted from the ON state to the OFF state at the time a time point $t_6$ elapsed from the time point $t_5$ by a predetermined period of time $t_c$, such as 10 msec. Such a time lag $t_c$ is important to prevent back-flow from the output line of the master cylinder 2 through the first directional control valve 4 and the second directional control valve 5 to the output line of the external pressure source 3. The ABS control is started from the time point $t_6$ at which the wheel-cylinder pressure intensifying valves 6 and 8 are opened, while keeping the closed states of the wheel-cylinder pressure reducing valves 7 and 9. Upon the time reaches from the time point $t_6$ to the time point $t_7$, the ABS pressure reducing control is performed, in which the pressure intensifying valves 6 and 8 are both closed again and the pressure reducing valves 7 and 9 are both opened. Simultaneously, the ABS pump driving motor 32 is driven for a predetermined period of time $t_b$. As appreciated from the flow charts of FIG. 3 representative of opening and closing operations of the pressure intensifying valves 6 and 8 and the pressure reducing valves 7 and 9, the control unit 36 effectively performs the ABS control by repeating three modes, namely the wheel-cylinder pressure intensifying mode corresponding to the region defined between the time points $t_6$ and $t_7$, the wheel-cylinder pressure reducing mode referred to as the ABS pressure reducing control mode, and the wheel-cylinder pressure holding mode.

As will be appreciated from the above description of the first embodiment, even when the ABS control is performed subsequently to the TCS control, the ABS pump is driven for a predetermined period $t_a$ during the transient termination procedure of the TCS control, so that the brake fluid stored in the reservoir 10 is returned to the accumulator 11 in advance. Therefore, a wheel-cylinder pressure reducing efficiency is remarkably enhanced in the anti-skid pressure reducing control mode.

Figure 4:
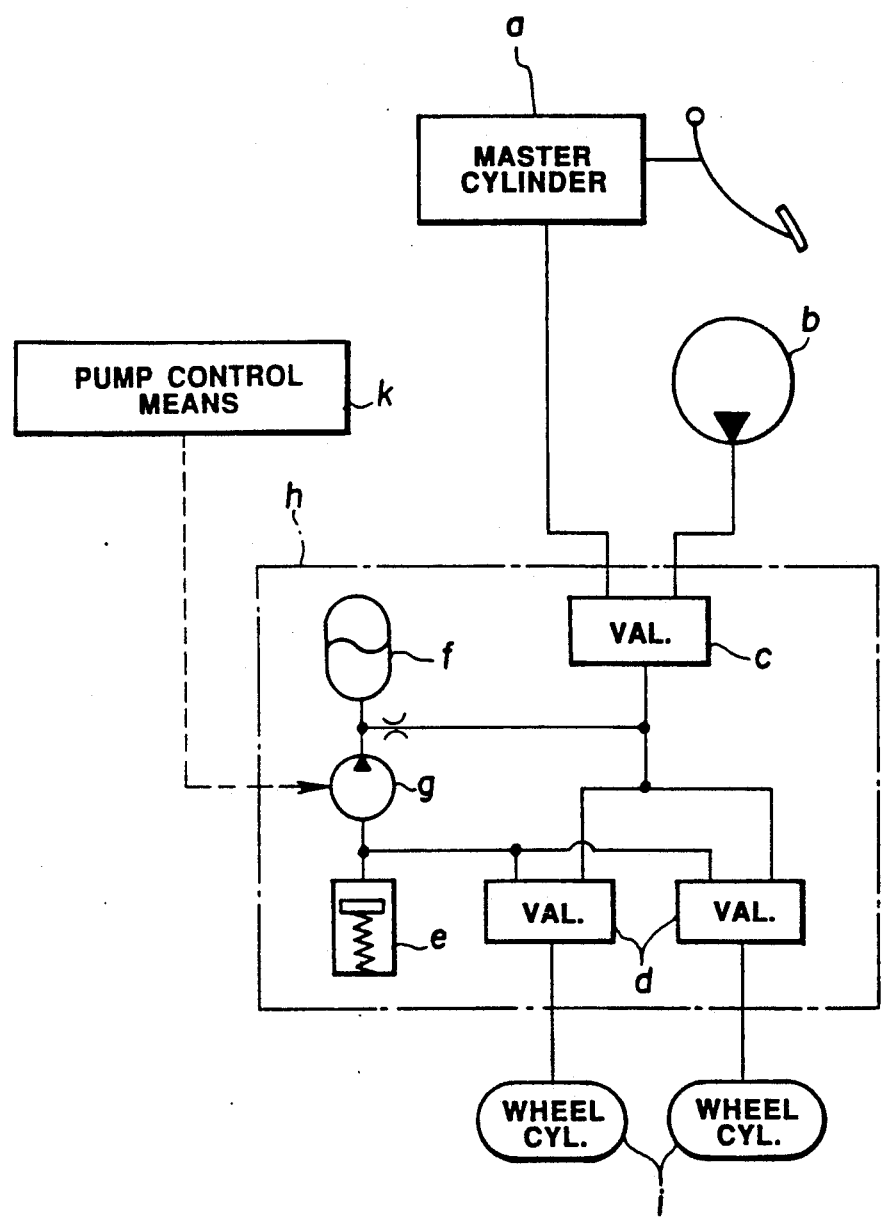
FIG. 4 is a block diagram illustrating essential parts utilized in the first embodiment of the brake control system of the invention.

As shown in FIG. 4, the automotive brake control system of the first embodiment according to the invention will operate as follows.

During operation of the TCS, a wheel-cylinder pressure control means h (corresponding to a brake fluid pressure control actuator) is operated on the basis of the fluid pressure generated from an external brake fluid pressure source b by switching a directional control valve c. During operation of the TCS, the actuator h operates at three operational modes, namely a wheel-cylinder pressure intensifying mode in which a brake fluid pressure control valve means d is kept in a position intensifying wheel-cylinder pressures in a manner so as to apply the fluid pressure generated from the external fluid pressure source b to wheel cylinders i, a wheel-cylinder pressure holding mode in which the pressure control valve means d is kept in a position holding the wheel-cylinder pressures in a manner so as to prevent brake fluid supply to the wheel cylinders i, and a wheel-cylinder pressure reducing mode in which the pressure control valve means d is kept in a position reducing the wheel-cylinder pressure in manner so as to return the brake fluid from the wheel cylinders i to a reservoir e. Upon a stop instruction of the TCS control is output, a pump control means k outputs a control instruction in response to which a fluid pump g is driven for a predetermined period of time, with the result that the brake fluid stored in the reservoir e at the previously noted wheel-cylinder pressure reducing mode in the TCS control is accumulated from the reservoir e through the pump g to a pressure accumulator f.

Thereafter, when the vehicle wheels would be locked during quick braking or braking on a low frictional road surface, the ABS comes into operation.

During operation of the ABS, the wheel-cylinder pressure control means h is operated on the basis of a master-cylinder pressure generated by a master cylinder a by switching the directional control valve c. During operation of the ABS, the wheel-cylinder pressure control means h operates at the same three operational modes as the TCS, namely the pressure intensifying mode in which the brake fluid generated from the master-cylinder a is supplied to the wheel cylinders i, the pressure holding mode, and the pressure reducing mode.

Figure 5:
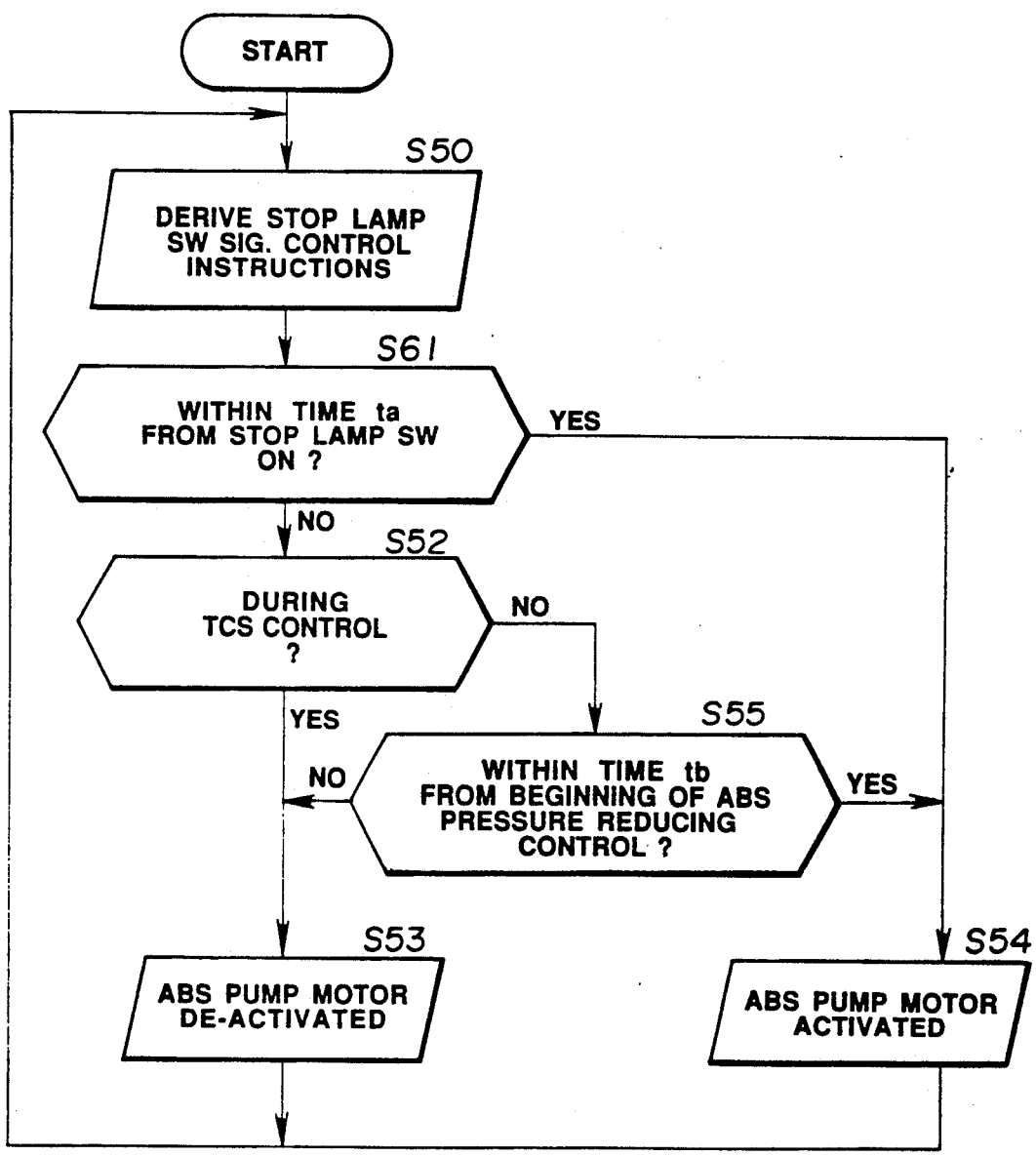
FIG. 5 is a flow chart illustrating a control procedure for the auxiliary pump unit controlled by a control unit utilized in a second embodiment of the brake control system according to the invention.

Referring now to FIG. 5, there is shown another ABS pump control procedure which is performed by the control unit employed in the second embodiment of the brake control system according to the invention. The procedure will be herebelow described in detail, in accordance with the flow chart of FIG. 5. The control procedure of the second embodiment shown in FIG. 5 is different from that of the first embodiment shown in FIG. 2, in that step 51 is replaced with step 61. Since the control procedure executed by the control unit employed in the second embodiment is otherwise similar to the first embodiment, the same steps of the control procedure of the first embodiment will be applied to the corresponding steps of the control procedure of the second embodiment, for the purpose of comparison between the first and second embodiments.

In step 61, the control unit determines whether or not the time elapsed from a time point at which the stop lamp switch is shifted from an OFF state to an ON state is within a setting time $t_a$. If the answer to step 61 is in the negative, step 52 proceeds in which a test is made to determine whether or not the control unit performs the TCS control. If the answer to step 61 is in the affirmative, step 54 proceeds in which the control unit outputs a control instruction according to which the ABS pump motor 32 is activated.

When the control unit of the second embodiment outputs the control instruction for the ABS control after the TCS control, the control operation is performed as follows.

First, the TCS control is started so as to reduce the magnitude of traction applied to driven wheels, utilizing controlled braking forces applied to the driven wheels, when the slippage occurring at the driven wheels exceeds a predetermined threshold value satisfying the TCS control starting condition. Under this condition, the control procedure flows through steps 50, 61, 52 and 53, in that order, since the TCS control is actually performed. At this time, the ABS pump 12 is not rotated. During the TCS control, the brake fluid pressure control actuator 13 is controlled by the control unit, such that TCS control is performed on the basis of the brake fluid pressure generated by the external fluid pressure source 3 by switching the valves 4 and 5 to ON states wherein the first directional control valve 4 is kept in a valve closed position and the second directional control valve 5 is kept in a valve open position. The control unit of the second embodiment executes the TCS control among the wheel-cylinder pressure intensifying mode, the wheel-cylinder pressure holding mode, and the wheel-cylinder pressure reducing mode, in the same manner of the first embodiment. In the case of the control unit of the second embodiment, when the braking operation is made i.e., the brake-pedal is depressed and the stop lamp switch is shifted from an OFF state to an ON state before or after a stop instruction for the TCS control is output, the time is measured by the timer employed in the control unit, from a time point at which the stop lamp switch becomes switched ON. Until the measured time reaches a setting time $t_a$, the control procedure jumps from step 50 through step 61 to step 54. In this manner, the ABS pump 12 is rotated for the setting time $t_a$ when the stop lamp switch is ON before or after the stop instruction for the TCS control has been output, with the result that the brake fluid stored in the reservoir 10 at the wheel-cylinder pressure reducing mode of the TCS control is returned to the accumulator 11.

Thereafter, when the rear wheels would be locked due to quick braking or braking on a low frictional road surface, the ABS comes into operation. During the ABS control., the brake fluid pressure control actuator 13 is controlled by the control unit, such that the ABS control is performed on the basis of the master-cylinder pressure by switching the valves 4 and 5 to OFF states wherein the first directional control valve 4 is kept in a valve open position and the second directional control valve 5 is kept in a valve closed position. The control unit executes the ABS control among the wheel-cylinder pressure intensifying mode, the wheel-cylinder pressure holding mode, and the wheel-cylinder pressure reducing mode, in the same manner as the first embodiment. In the wheel-cylinder pressure reducing mode of the ABS control, the brake driven for the setting time $t_a$ from a time point fluid in each wheel cylinder can be smoothly reduced since the brake fluid stored in the reservoir 10 is returned to the accumulator 11 through the pump 12 driven for the setting time $t_a$ from a time point at which the stop lamp switch becomes switched ON before or after the stop instruction for the TCS control is output. As set forth above, when the ABS control is performed after the TCS control, the control procedure flows from step 50 through steps 61 and 52 to step 55. Just after the previously described ABS pressure reducing control starts, the time is measured. Until the time elapsed from the beginning of the ABS pressure reducing control reaches a setting time $t_b$, the control procedure advances from step 55 to step 54. In this manner, the ABS pump 12 is rotated for the setting time $t_b$, the control procedure is shifted from step 54 to step 53, with the result that the ABS pump 12 is stopped.

Figure 6:
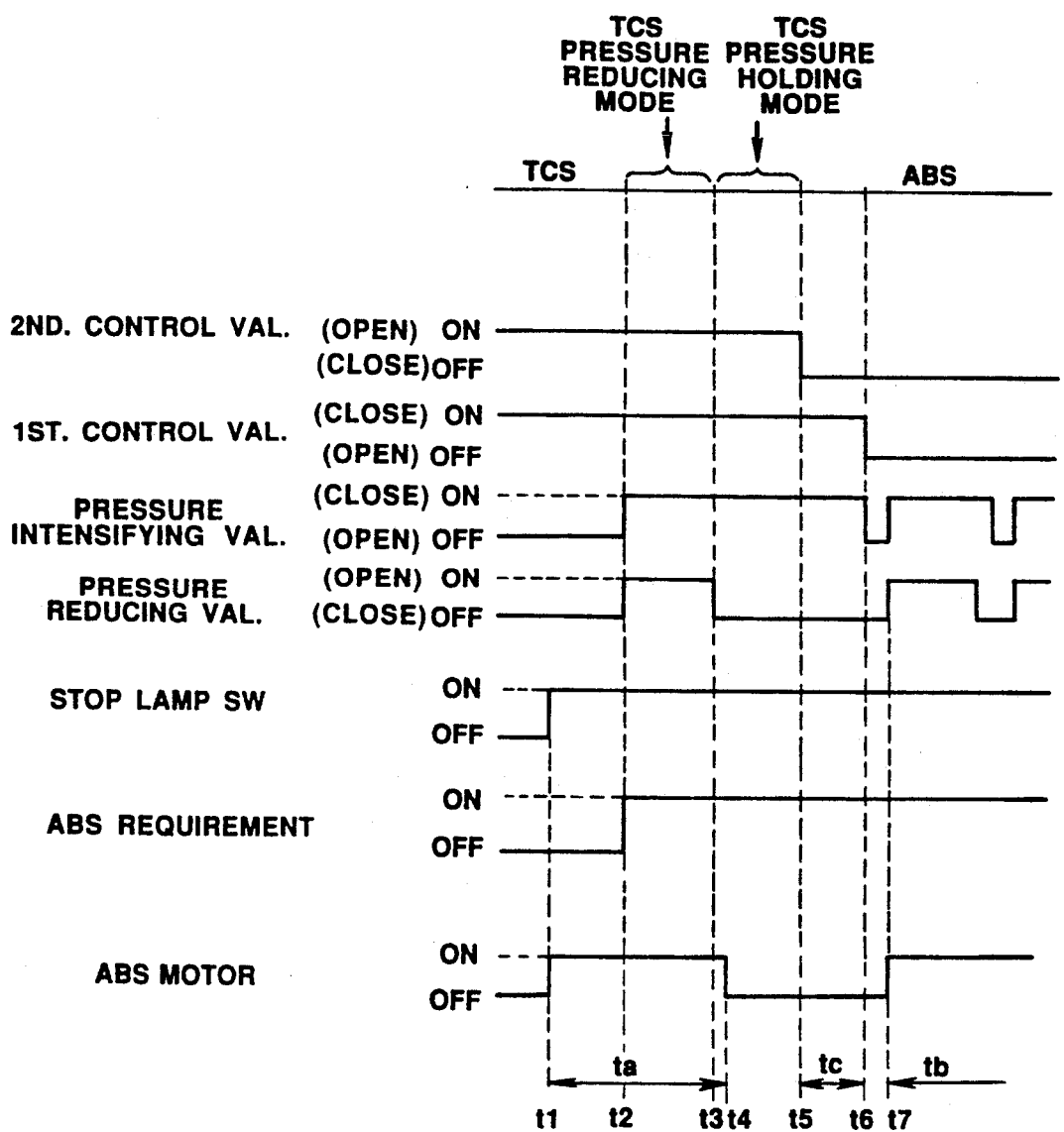
FIG. 6 is timing charts illustrating a control operation performed by the control unit of the second embodiment, when an anti-skid brake control instruction is output during the traction control.

When the ABS control is required during the TCS control, the control unit of the second embodiment performs the control procedure in accordance with the time charts illustrated in FIG. 6.

Referring now to FIG. 6, upon the stop lamp switch 34 becomes ON at a time point $t_1$ during the TCS control, the control unit outputs a control instruction so as to operate the ABS pump motor 32 for a predetermined period of time $t_a$ defined between the time points $t_1$ and the $t_4$. As soon as a predetermined time has elapsed and the time reaches a time point $t_2$, a stop instruction for the TCS control is output on the basis of the ABS requirement. Simultaneously, the control unit of the second embodiment controls the brake fluid pressure control actuator 13 at the wheel-cylinder pressure reducing mode for a time interval defined between the two time points $t_2$ and $t_3$ and at the wheel-cylinder pressure holding mode for a time interval defined between the two time points $t_3$ and $t_5$. The transient procedure shifting from the pressure reducing mode to the pressure holding mode is necessary for a termination procedure for the TCS control. At the time point $t_5$, the second directional control valve 5 is switched OFF. On the other hand, the first directional control valve 4 is also switched OFF at the time point $t_6$ elapsed from the time point $t_5$ by a predetermined time lag $t_c$, for example 10 msec. The time lag is provided for preventing backflow from the output line of the master cylinder 2 through the first directional control valve 4 and the second directional control valve to the output line of the external fluid pressure source 3. The ABS control is started from the time point $t_6$ at which the wheel-cylinder pressure intensifying valves 6 and 8 are opened, while keeping the wheel-cylinder pressure reducing valves 7 and 9 closed. Upon the time reaches from the time point $t_6$ to the time point $t_7$, the ABS pressure reducing control is performed. From the time point $t_7$, the ABS pump 12 is driven for a predetermined period of time $t_b$.

In the control unit utilized in the first or second embodiment, although the ABS pump is rotated for the predetermined period of time $t_b$ from the beginning of the ABS pressure reducing control, the ABS pump may be driven from the beginning of the ABS pressure reducing control to the end of one cycle of the ABS pressure reducing control. In other words, the ABS pump may be driven in synchronization with every ABS pressure reducing control.

As will be appreciated from the above description of the second embodiment, even when the ABS is performed subsequently to the TCS, the ABS pump is driven for a predetermined period $t_a$ when the brake lamp As will be appreciated from the above description of the second embodiment, even when the ABS is performed subsequently to the TCS, the ABS pump is switch is switched ON before or after the TCS control instruction is stopped, so that the brake fluid stored in the reservoir 10 is returned to the accumulator 11 in advance. The control unit of the second embodiment as well as the first embodiment assures a high wheel-cylinder pressure reducing efficiency in the ABS pressure reducing control performed subsequently to the TCS.

Figure 7:
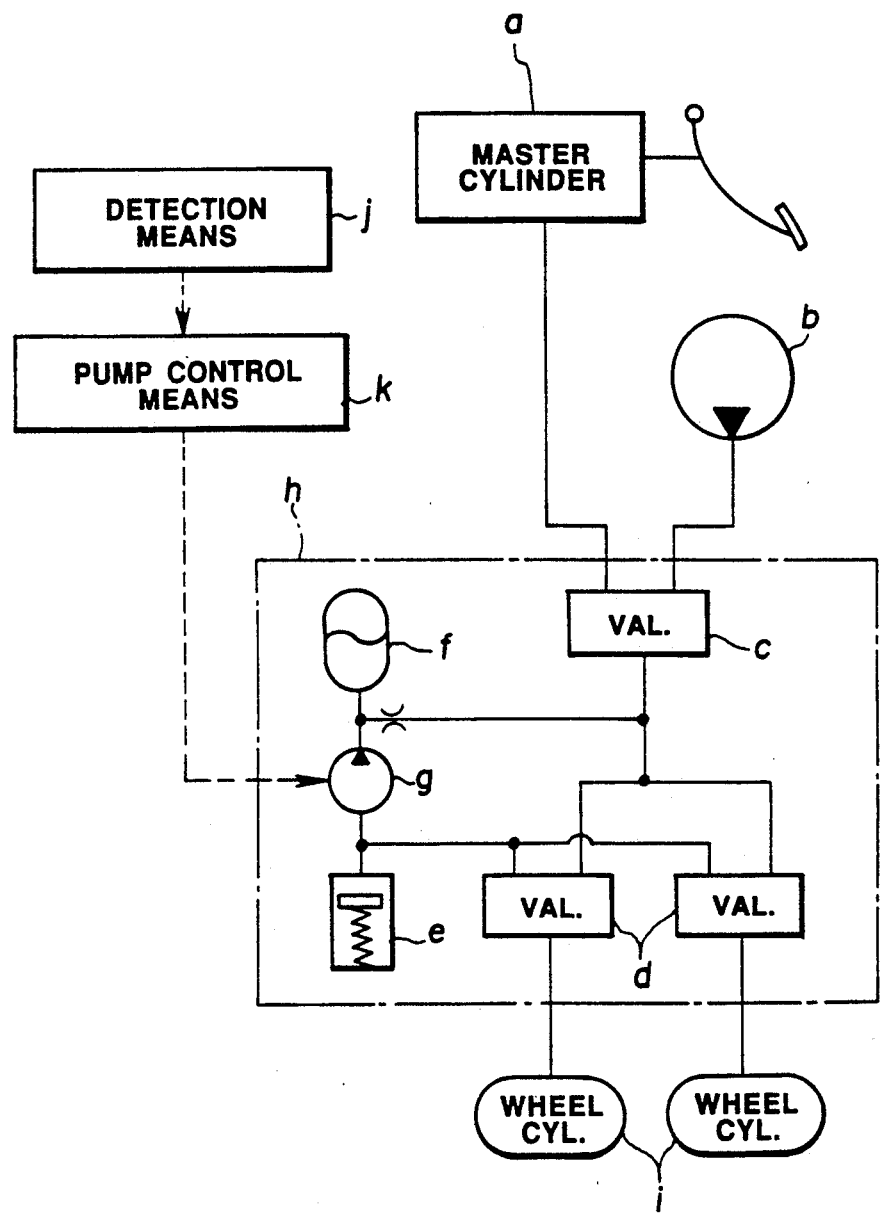
FIG. 7 is a block diagram illustrating essential parts utilized in the second embodiment of the brake control system of the invention.

As shown in FIG. 7, the automotive brake control system of the second embodiment according to the invention will operate as follows.

During operation of the TCS, a wheel-cylinder pressure control means h (corresponding to a brake fluid pressure control actuator) is operated on the basis of the fluid pressure generated from an external brake fluid pressure source b by switching a directional control valve c. During the TCS control, the wheel-cylinder pressure control means h operates at three operational modes, namely a wheel-cylinder pressure intensifying mode in which a brake fluid pressure control valve means d is kept in a manner so as to apply the fluid pressure generated from the external fluid pressure source b to wheel-cylinders i, a wheel-cylinder pressure holding mode for retaining the wheel-cylinder pressure unchanged, and a wheel-cylinder pressure reducing mode for returning the brake fluid in the wheel cylinders i to a reservoir e. When the brake-pedal depressed state is detected by a braking operation detection means j, such as a stop lamp switch, before or after a stop instruction for the TCS control is output, a pump control means k outputs a control instruction in response to which a fluid pump g is driven for a predetermined period of time, with the result that the brake fluid stored in the reservoir e at the wheel-cylinder pressure reducing mode in the TCS control is accumulated from the reservoir e through the pump g to a pressure accumulator f.

Thereafter, when the ABS control is performed due to quick braking or braking on a low friction road surface, the wheel-cylinder pressure control means h is operated on the basis of a master-cylinder pressure generated by a master cylinder a by switching the directional control valve c. During the ABS control, the wheel-cylinder pressure control means h operates at the same three operational modes as the TCS control, namely the pressure intensifying mode in which the brake fluid generated from the master cylinder a is fed to the wheel cylinders i, the pressure holding mode, and the pressure reducing mode.

As will be appreciated from the above, since the automotive brake control system according to the invention can operate the ABS pump 12 at a subsidiary ABS pump control mode in which the ABS pump 12 is driven for a predetermined period of time $t_a$ at a particular timing, i.e., at a time point where a stop instruction for the TCS is output or at a time point where a brake depressed), upon, before and after the stop instruction for the TCS is output, in addition to a basic ABS pump control mode in which the ABS pump 12 is driven during the ABS pressure reducing control, the system of the invention can reduce the magnitude of vibration and the noise level and generated by the ABS pump during the TCS pressure reducing control. Furthermore, since the brake fluid in a reservoir 10 temporarily storing the brake fluid exhausted from wheel-cylinders is timely furnished to a pressure accumulator 11 in advance to the ABS pressure reducing control, in accordance with the previously noted subsidiary ABS pump control, the brake fluid in the wheel cylinders can be smoothly reduced to the reservoir 10 during the ABS pressure reducing control.

In the first embodiment, since the control unit performs the subsidiary ABS pump control, on the basis of a stop instruction for the TCS control unit without introducing additional sensors, it is very advantageous to lower production costs for the automotive brake control system.

In the second embodiment, it is advantageous to achieve the subsidiary ABS pump control, on the basis of an ON/OFF state of the stop lamp switch necessarily mounted on the vehicle body.

Although an electromagnetic two-position solenoid valve is utilized in the embodiments as a directional control valve or a fluid-pressure control valve an electromagnetic three-position solenoid valve may be utilized instead so as to decrease the number of valves employed in a brake fluid pressure control actuator 13.

Although the control unit determines on the basis of an ON/OFF state of a stop lamp switch whether the brake pedal is operated, the operation of brake-pedal may be monitored by a master-cylinder pressure sensor or a stroke sensor for detecting a brake-pedal depression amount.

While the foregoing is a description of the preferred embodiments for carrying out the invention, it will be understood that the invention is not limited to the particular embodiments shown and described herein, but may include variations and modifications without departing from the scope or spirit of this invention as described by the following claims.

What is claimed is:

1. An automotive brake control system, comprising:
   a master cylinder for generating a master-cylinder pressure based on a movement of a brake pedal; pressure based on a movement of a brake pedal;
   an external brake fluid pressure source for generating a brake fluid pressure regardless of a depression of the brake pedal;
   a wheel-cylinder pressure control means for controlling a wheel-cylinder pressure in a wheel cylinder on the basis of the brake fluid pressure generated by said external brake fluid pressure source during a traction control performed for suppressing excessive driving force exerted on driven wheels and on the basis of the master-cylinder pressure during an anti-skid brake control performed for preventing brakes from locking vehicle wheels;
   said wheel-cylinder pressure control means including a fluid reservoir storing brake fluid released from said wheel cylinder and a brake fluid return pump for supplying the brake fluid stored in said reservoir to a pressure accumulator, said brake fluid return pump being operative during the anti-skid brake control and inoperative during the traction control; and
   a pump control means for controlling said pump, such that said pump control means drives said brake fluid return pump for a first predetermined period of time in a wheel-cylinder pressure reducing mode in which said wheel-cylinder pressure is reduced during the anti-skid brake control and drives said brake fluid return pump for a second predetermined period of time substantially at a time point where one cycle of the traction control ends, so as to feed the brake fluid from said reservoir to said accumulator.

2. The brake control system as set forth in claim 1, wherein:
   said pump control means drives said brake fluid return pump for said second period of time in synchronization with an output of stop instruction for the traction control.

3. The brake control system as set forth in claim 2, wherein:
   said pump control means drives said brake fluid return pump for said second period of time from the beginning of the output of stop instruction for the traction control.

4. The brake control system as set forth in claim 1, which further comprises:
   a braking operation detection means for monitoring the depression of the brake pedal, and
   wherein said pump control means drives said brake fluid return pump for said second period of time from a time point where said braking operation detection means determines that the brake pedal is depressed substantially at the end of one cycle of the traction control.

5. The brake control system as set forth in claim 4, wherein:
   said braking operation detection means includes a stop lamp switch generating a signal representative on an ON state thereof.

6. The brake control system as set forth in claim 5, wherein:
   said pump control means drives said brake fluid return pump for said second period of time from a time point where the brake pedal is depressed, upon, just before, and just after the output of a stop instruction for the traction control.

7. The brake control system as set forth in claim 1, wherein:
   said wheel-cylinder pressure control means includes a directional control valve means for switching the brake fluid pressure supplied therethrough to said wheel cylinder from one of the fluid pressure generated from said external brake fluid pressure source and the master-cylinder pressure to the other, and a fluid pressure control valve means which is capable of operating in three modes, namely a wheel-cylinder pressure intensifying mode in which said pressure control valve permits the fluid pressure output from said directional control valve means to apply to said wheel cylinder, a wheel-cylinder pressure holding mode in which said pressure control valve means prevents the brake fluid from flowing from and toward said wheel-cylinder, and a wheel-cylinder pressure reducing mode in which said pressure control valve means permits the brake fluid in said wheel cylinder from being released.

8. The brake control system as set forth in claim 7, wherein:
   said directional control valve means comprises a first electromagnetic two-position solenoid valve, and said fluid pressure control valve means comprises a second electromagnetic two position solenoid valve.

* * * * *